US010136458B2

(12) United States Patent
Vikberg

(10) Patent No.: US 10,136,458 B2
(45) Date of Patent: Nov. 20, 2018

(54) METHOD AND ARRANGEMENT FOR CONTROLLING CONNECTION IN COMMUNICATION NETWORKS

(71) Applicant: TELEFONAKTIEBOLAGET L M ERICSSON (PUBL), Stockholm (SE)

(72) Inventor: Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 180 days.

(21) Appl. No.: 15/102,828

(22) PCT Filed: Dec. 10, 2013

(86) PCT No.: PCT/SE2013/051479
§ 371 (c)(1),
(2) Date: Jun. 8, 2016

(87) PCT Pub. No.: WO2015/088404
PCT Pub. Date: Jun. 18, 2015

(65) Prior Publication Data
US 2017/0027006 A1    Jan. 26, 2017

(51) Int. Cl.
*H04W 84/12* (2009.01)
*H04W 88/06* (2009.01)
*H04W 88/12* (2009.01)
*H04W 76/11* (2018.01)
*H04W 76/27* (2018.01)
(Continued)

(52) U.S. Cl.
CPC ............ *H04W 76/11* (2018.02); *H04W 12/06* (2013.01); *H04W 36/0061* (2013.01);
(Continued)

(58) Field of Classification Search
CPC ...... H04W 84/12; H04W 88/06; H04W 88/12
See application file for complete search history.

(56) References Cited

U.S. PATENT DOCUMENTS

| 9,749,923 | B2* | 8/2017 | Pampu | ................ H04W 36/30 |
| 2010/0105394 | A1 | 4/2010 | Cheng et al. | |
| 2016/0066251 | A1* | 3/2016 | Sirotkin | ................ H04W 48/14 370/328 |

FOREIGN PATENT DOCUMENTS

| EP | 2083580 A1 | 7/2009 |
| WO | 2005114918 A2 | 12/2005 |
| WO | 2006012909 A1 | 2/2006 |

OTHER PUBLICATIONS

4G Americas, Integration of Cellular and Wi-Fi Networks, Sep. 2013.

(Continued)

*Primary Examiner* — Marisol Figueroa
(74) *Attorney, Agent, or Firm* — Baker Botts, LLP

(57) ABSTRACT

Method and arrangement for enabling a UE (User Equipment) to access a WLAN (Wireless Local Area Network). The UE detects a need for the UE to access the WLAN. Furthermore, the UE creates an ARC (Association Reason Code) based on the detected need, and sends the ARC to a WLAN node of the WLAN, such that the UE is thereby enabled to connect to the WLAN in accordance with the ARC. By implementing functionality in a UE to create an association reason code and send the association reason code to a WLAN node, an operator of a communication network will be able to influence and control connection of the UE to the WLAN node. Thereby, the operator will be able to effectively make use of installed communication resources.

24 Claims, 6 Drawing Sheets

(51) Int. Cl.
  *H04W 36/14* (2009.01)
  *H04W 48/18* (2009.01)
  *H04W 36/00* (2009.01)
  *H04W 12/06* (2009.01)
  *H04W 28/08* (2009.01)

(52) U.S. Cl.
  CPC ........... *H04W 36/14* (2013.01); *H04W 48/18* (2013.01); *H04W 76/27* (2018.02); *H04W 28/08* (2013.01); *H04W 84/12* (2013.01); *H04W 88/06* (2013.01); *H04W 88/12* (2013.01)

(56) References Cited

OTHER PUBLICATIONS

3GPP TR 37.834 V1.3.0 3rd Generation Partnership Project; Technical Specification Group Radio Access Network; Study on WLAN/3GPP radio interworking (Release 12), Nov. 2013.
AT&T et al., WLAN/3GPP Radio Interworking Impacts to Core Network for Discussion with SA2/CT1, 3GPP TSG-RAN WG2 Meeting #83bis, R2-133432, Ljubljana, Slovenia, Oct. 7-11, 2013.
3GPP TS 23.402 V12.1.0 3rd Generation Partnership Project; Technical Specification Group Services and System Aspects; Architecture enhancements for non-3GPP access (Release 12), Jun. 2013.
3GPP TS 44.318 V10.0.0 3rd Generation Partnership Project; Technical Specification Group GSM/EDGE Radio Access Network; Generic Access Network (GAN); Mobile GAN interface layer 3 specification (Release 10); Dec. 2010.

* cited by examiner

METHOD AND ARRANGEMENT FOR CONTROLLING CONNECTION IN COMMUNICATION NETWORKS

This application is a 371 of International Application No. PCT/SE2013/051479, filed Dec. 10, 2013, the disclosure of which is fully incorporated herein by reference.

TECHNICAL FIELD

The present disclosure relates to connection of UEs (User Equipments) in communication networks, especially it relates to controlled connection of UEs to WLANs (Wireless Local Area Networks).

BACKGROUND

With emergence of new information services, the amount of data to be exchanged between end users has increased. Various communications technologies and communication networks have been developed, to enable transmission of larger data traffic volumes.

In the modern society, end users will be connected by communication devices, such as UEs (User Equipments), to information servers of service providers. For instance, a user who listens to streamed music or watches streamed TV, e.g. IPTV (Internet Protocol TeleVision) will be connected with a UE to information servers via a RAN (Radio Access Network) and a core network that provide access to Packet Data Networks, such as the Internet.

Network operators and public service providers often offer access to the Internet via WLANs (Wireless Local Area Networks). Typical such service providers may be: shopping centers, railway stations, public transportations as trains and buses, hospitals, cafés. Furthermore, such services may also be provided at public locations, where a lot of users are present and communication capacity of telecommunication networks is restricted, e.g. at sport arenas, concerts etc.

With reference to FIG. 1, which is a schematic overview, a situation in a communication network will now be described according to the prior art.

In a telecommunication network, a UE 100 is connected to an RBS (Radio base station) 108 of a RAN (Radio Access Network) 104. The RBS 108 serves the UE 100 with communication capacity, such that the UE 100 will be able to use services as voice or data communication via the RAN 104. When the UE 100 is present in a coverage of a Wi-Fi node 106, e.g. a standalone Wi-Fi access point or a combined Wi-Fi access point and access controller, the UE 100 discovers the Wi-Fi node 106, and may try to connect to the Wi-Fi node 106 to get increased communication capacity, such as higher data rate or, less delays.

However, the communication capacity of installed Wi-Fi access points 106 is in general limited, and there may be a problem to provide enough communication resources to the users of the UEs.

In a plurality of situations, detection of Wi-Fi networks by UEs may give rise to problems. For instance, when the UE has detected and connected to a Wi-Fi network, but the RAN is capable to provide better services to the end user of the UE, the UE will not reconnect to the RAN before it detects that the Wi-Fi communication capacity is too low. Thus, the UE will be prevented from using the better services of the RAN.

Furthermore, when a UE has connected to a Wi-Fi network, and detects that the communication capacity in the Wi-Fi decreases, it will reconnect to the RAN. However, in situations where the communication capacity varies, the UE might then be toggling between the Wi-Fi and the RAN, which consumes power and calculation capacity of the UE.

Moreover, a fast moving UE will try to connect to detected Wi-Fi network which it passes, e.g. when travelling on a train and passing an office building with a Wi-Fi network. However, these Wi-Fi networks may only be able to serve the UE for a short time. Typically, the UE may already be outside the Wi-Fi coverage when being connected. The connecting process will then consume calculation resources for the UE without providing the UE with any increased communication capacity.

Thus, there is a need to make use of installed communication resources more fair and effectively, and also to increase the effort for the users.

SUMMARY

It would be desirable to obtain improved performance in communication networks. It is an object of this disclosure to address at least any of the issues outlined above.

Further, it is an object to provide a mechanism for improved management control of UEs in Wireless Local Area Networks. These objects may be met by arrangements according to the attached independent claims.

According to one aspect, a method of enabling a UE (User Equipment) to access a WLAN (Wireless Local Area Network) is provided. The method comprises that the UE detects a need for the UE to access the WLAN. Furthermore, the UE creates an ARC (Association Reason Code) based on the detected need, and sends the ARC to a WLAN node of the WLAN, such that the UE is thereby enabled to connect to the WLAN in accordance with the ARC.

Detecting the need may comprise at least one of; obtaining from a RAN node, such as a NodeB or an eNodeB, an instruction to connect the UE to the WLAN, and obtaining from a network node, such as an Access Network Discovery and Selection Function, ANDSF, server, various communication policies. Creating the ARC may be based on at least one of the instruction to connect the UE to the WLAN and the various communication policies.

Furthermore, the instruction to connect the UE may comprise at least one of an explicit WLAN access selection command or RAN control parameters, such as RAN and WLAN radio signal threshold parameters, and the various communication policies may comprise information about WLAN network selection or traffic routing policies. Moreover, the UE may be in RRC connected state or RRC idle state, and the ARC may be created upon evaluation reception of the explicit WLAN access selection command from the RAN node, or upon evaluation of the RAN control parameters received from the RAN node. In addition, the ARC may be created upon evaluation of the WLAN network selection or traffic routing policies, and the instruction to connect the UE. The WLAN may be implemented as a Wi-Fi (Wireless Fidelity) network, and the WLAN node may be implemented as a Wi-Fi Access Point or a Wi-Fi Access Controller.

According to another aspect, a UE which is adapted to access a WLAN is provided. The UE comprises a controller which is adapted to detect a need for the UE to access the WLAN, and crate an ARC, based on the detected need. Further, the UE comprises a communication unit which is adapted to send the ARC to a WLAN node of the WLAN, such that the UE is thereby enabled to connect to the WLAN in accordance with the ARC.

According to a further aspect, a method of enabling a UE to access a WLAN node is provided. The method comprises that a WLAN node receives an ARC from the UE, wherein the ARC was created based on a detected need to access the WLAN, such that the WLAN node is thereby enabled to connect the UE to the WLAN in accordance with the ARC.

According to yet another aspect, a WLAN node is provided, which is capable to conduct the UE to the WLAN according to the above defined method.

By implementing functionality in a UE to create an association reason code and send the association reason code to a WLAN node, an operator of a communication network will be able to influence and control connection of the UE to the WLAN node. For instance, the operator may set communication policies and rules in an ANDSF server, which the UE obtains and uses as a basis for the association reason code. Thereby, the operator may effectively make use of installed communication resources. Advantageously, old UEs without functionality to access ANDSF servers may coexist in communication networks together with new UEs with functionality to access ANDSF servers and create ARC. When the WLAN is a Wi-Fi network, the old UEs may operate in accordance with Wi-Fi preference, while the new UEs may make use of their capability to inform a Wi-Fi node regarding the reason to connect.

BRIEF DESCRIPTION OF DRAWINGS

The solution will now be described in more detail by means of exemplary embodiments and with reference to the accompanying drawings, in which.

DETAILED DESCRIPTION

In communication networks, a UE which is associated to a RAN (Radio Access Network) detects a need to connect to a WLAN (Wireless Local Area Network), e.g. a Wi-Fi (Wireless Fidelity) network. Based on the need, the UE informs a WLAN node about the reason to connect to the WLAN, by creating and sending an Association Reason Code.

Today, a UE which is served by a RAN and identifies a Wi-Fi network may select to connect to a Wi-Fi Access Point in order to exchange data. For instance, when RAN communication capacity is limited or when RAN coverage is bad, the UE may be able to get increased communication capacity via the Wi-Fi network. It is then up to the UE to try to connect to the Wi-Fi network. In other words, as long as the UE is located within the RAN it is controlled by the operator of the RAN, but the selection of Wi-Fi is solely controlled by the UE itself. The case when the UE detects and selects to Wi-Fi networks is also referred to as a "Wi-Fi preference solution".

However, the operator's possibility to influence the UE's selection of communication network, i.e. RAN or Wi-Fi, is limited.

There exist also solutions, which will overcome these restrictions.

For instance, a RAN node may demand UEs to connect to or switch to Wi-Fi networks instead. An operator may further define a communication policy and register into an ANDSF server. Based on the registered communication policy, the UE will then try to connect to the Wi-Fi network. The Wi-Fi node may further perform access control and decide whether or not to connect the UE. Thus, there is a need to provide the RAN, as well as the UEs with capacity to influence the selection between Wi-Fi networks and RANs.

In the exemplifying embodiments below, some solutions therefore will now be described.

Figure 1:
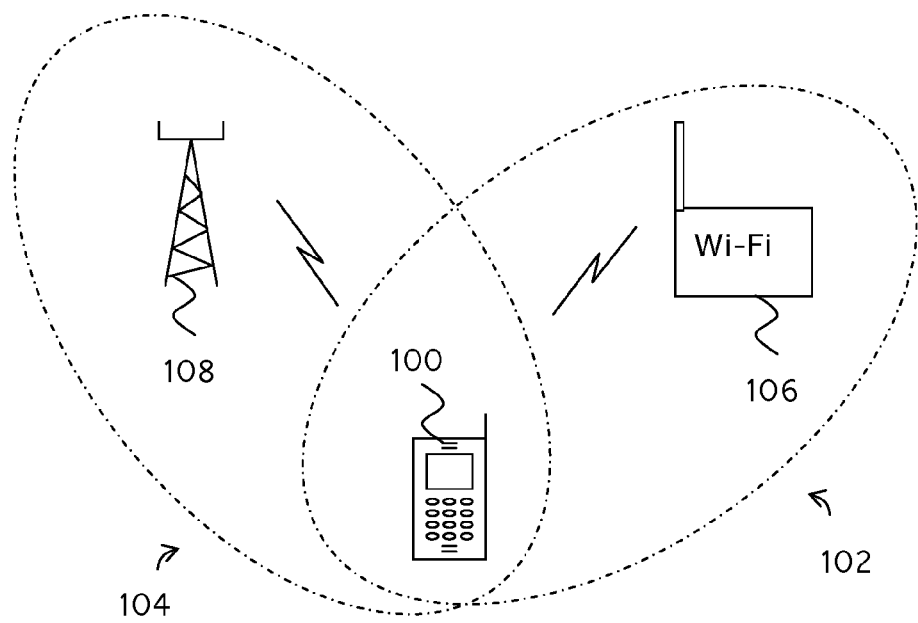
FIG. 1 is a schematic illustration of a communication situation in accordance with the prior art.
Figure 2:
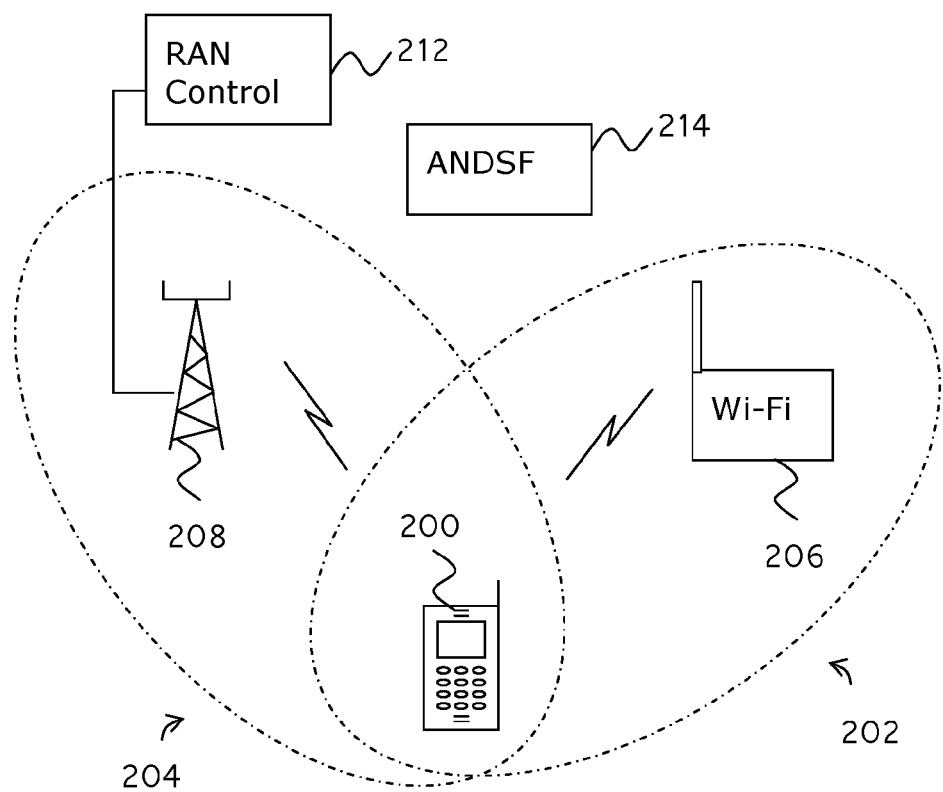
FIG. 2 is a schematic illustration of a communication situation, according to a possible embodiment.

With reference to FIG. 2, which is a schematic overview, a communication scenario of a UE will now be described in accordance with one exemplifying embodiment.

The UE 200 is connected to a RAN node 208 of a RAN (Radio Access Network) 204. Typically, the RAN node 208 is implemented as a radio base station of any appropriate radio technology, e.g. a BTS (Base Transceiver Station) of a GSM (Global System Mobile), a NodeB of a HSPA (High Speed Packet Access)/WCDMA (Wireless Code Division Multiple Access) network, or an eNodeB of an LTE (Long Term Evolution) communication network.

Furthermore, the illustrated RAN node 208 may be one of a plurality of RAN nodes, which are controlled by a common control node (illustrated as RAN control) 212, such as BSC (Base Station Controller) in GSM networks and RNC (Radio Network Controller) in HSPA/WCDMA networks. It is to be noted that a UE may be connected to more than one RAN node. For instance, in the HSPA/WCDMA case the UE is connected to both an eNodeB and an RNC and the UE receives RNC information via the eNodeB.

However, to simplify the understanding, only one RAN node 208 is illustrated in the figure.

The UE 200 is further capable of accessing a Wi-Fi network 202 and is present in a coverage area of a Wi-Fi Access Point 206. A network operator may offer communication capabilities to UEs 200 via as well the RAN 204 and the Wi-Fi communication network 202.

Today, a UE 200 which is served by the RAN and identifies a Wi-Fi network 202 may select to connect to the Wi-Fi Access Point 206 in order to exchange data. For instance, when RAN communication capacity is limited or when RAN coverage is bad, the UE may be able to get increased communication capacity via the Wi-Fi network 202. It is then up to the UE 200 to try to connect to the Wi-Fi network 202. However, the operator's possibility to influence the UE's 200 selection of communication network, i.e. RAN or Wi-Fi, is limited.

With the arrangement of this embodiment, the UE 200 is provided with functionality to detect a need to connect to the Wi-Fi network node 206 and further to instruct the Wi-Fi node 206 regarding the reason to connect. The UE 200 detects the need to connect to the Wi-Fi network 202, by gathering information regarding the UE 200 from an ANDSF (Access Network Discovery and Selection Function) server 214, creates an ARC (Association Reason Code) based on the gathered information, and provides the ARC to the Wi-Fi node 206. Typically, such information could be implemented as various communication policies and may relate to a subscription of a user of the UE 200, or information regarding which type of terminal the UE 200 is, etc.

The operator has stored the communication policies in the ANDSF server 214 in advance or has made such arrangements that the communication policies can be dynamically created based on information changing either in the ANDSF server 214 or in external databases such as subscription database and network condition database. The operator is capable to update the communication policies when needed. Furthermore, the policies may be updated regularly in order to effectively make use of the operator's installed communication resources, e.g. once a week due to an increasing amount of subscriptions, or changes in subscriptions that are reflected in the communication policies, or changes in network conditions such as network load in different parts of the network.

By detecting a need to connect to a Wi-Fi node 206, creating and providing an ARC to the Wi-Fi node 206, the operator will be enabled to control which networks of the RAN 204 or the Wi-Fi network 202 that will provide services to the UE 200.

ANDSF is a function defined by the 3GPP (Third Generation Partnership Project), e.g. 3GPP TS 23.402, 24.302 and 24.312. One implementation of the ARC is a message in connection with Wi-Fi Access Attempt control. Alternatively, the ARC may be implemented as a message in connection with association, admission control or authentication.

Even if the detected need relates to a stored communication policy of the UE 200 in this exemplifying embodiment, other alternative needs may be used instead within the disclosed concept. For instance, the RAN node 208 may send an instruction to the UE 200 to connect to the Wi-Fi node 206, and the received instruction represents then the detected need.

Figure 3:
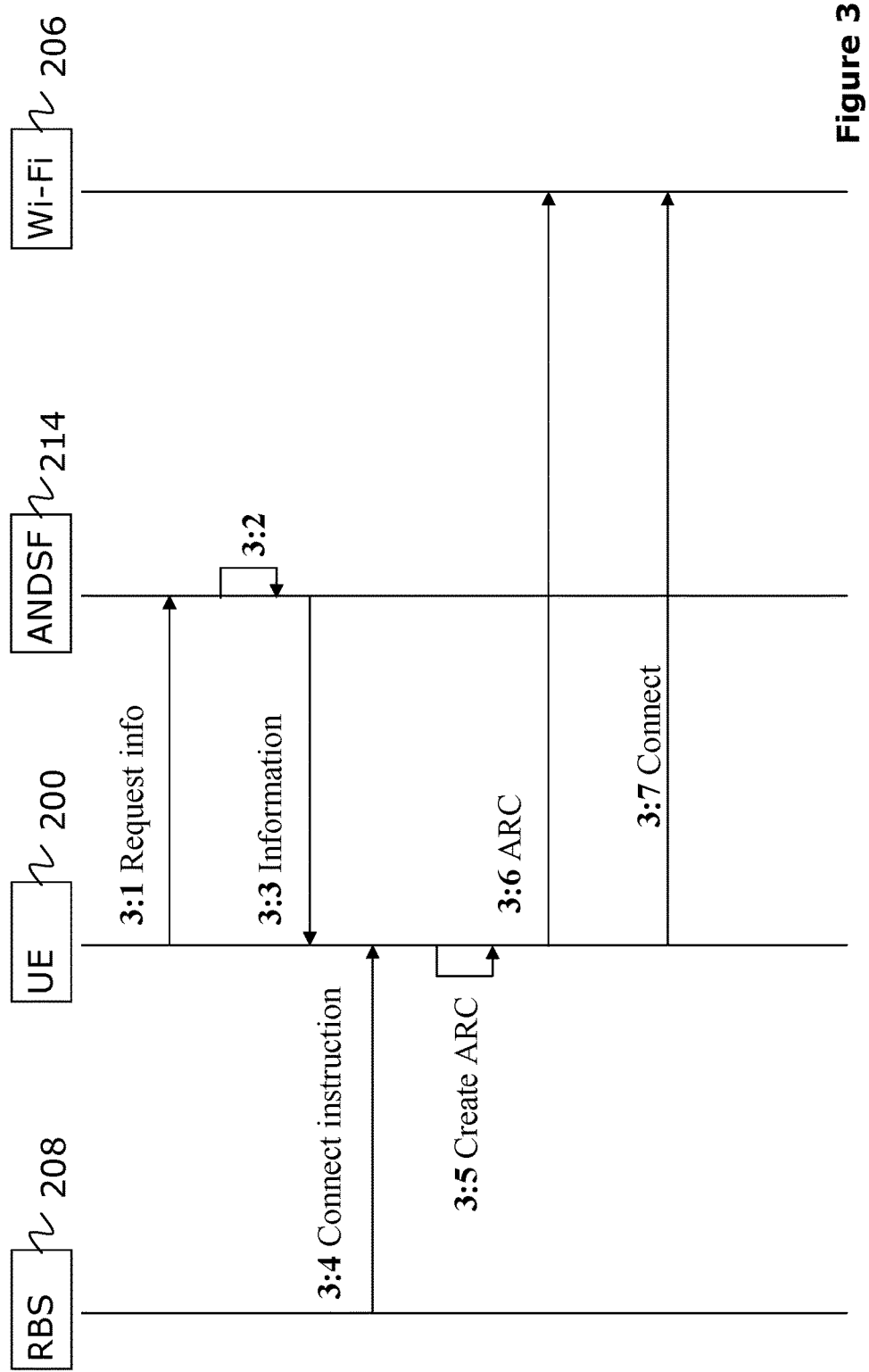
FIG. 3 is a schematic illustration of a communication scenario, according to possible embodiments.

With reference to FIG. 3, which is a schematic signalling diagram, a communication scenario of a UE will now be described in accordance with one exemplifying embodiment.

In a first action 3:1, the UE requests information from an appropriate ANDSF server 214, which have rules and/or policies regarding the UE 200 stored therein. The UE 200 communicates with the ANDSF server via an IP (Internet Protocol)-based S14-interface.

In another action 3:2, upon the received request the ANDSF server collects stored information regarding the UE 200, which is requested and/or relevant for communication of data, e.g. the information is based on the stored rules and communication policies. Then, in a following action 3:3, the ANDSF server provides the information to the UE 200.

In a subsequent action 3:4, The UE 200 receives an instruction to connect to a Wi-Fi access point 206 from an RBS (Radio base station) 208 of a telecommunication system. The instruction may also be originated from a RAN control node 212 and sent to the UE 200 via the RBS 208. For instance, a RAN control node 212 (not shown) has knowledge about that the UE 200 currently listens to streamed music and is located at a shopping mall, where the operator has installed a Wi-Fi Access point 206 and may initiate the instruction. Such an instruction will enable an operator to provide the UE 200 with larger capacity for receiving data, and to release communication capacity of the RAN for voice communication to other UEs.

Then, in another action 3:5, the UE 200 creates an ARC (Association reason Code), which it sends to a Wi-Fi Access point 206 in a following action 3:6. In a final action 3:7, the Wi-Fi Access point 206 connects the UE 200, in accordance with the received ARC. Alternatively, the Wi-Fi Access point 206 may instead refuse the UE 200 from being connected based on received ARC.

By creating an ARC based on communication policies, and sending the ARC to the Wi-Fi Access point 206, an operator will be enabled to instruct the Wi-Fi Access point 206 to connect the UE 200. Eventually, if the Wi-Fi Access point 206 is not able to provide enough communication capacity to the UE 200, it may disconnect other UEs or restrict their communication rates. For instance, the Wi-Fi Access point 206 may release communication capacity by disconnecting UEs who uses Wi-Fi only and are not subscribers to the RAN. Thereby, the operators will get improved control of installed communication resources and capacity.

In addition, the Wi-Fi Access point 206 may, optionally, verify with the RBS 208, or any suitable RAN control node whether the UE 200 should connect to the Wi-Fi Access point 206, or if it should stay connected to the RBS 208. This verification may be based on for example comparison of assumed user throughput comparison in the different accesses and the preference to keep the UE in the access that provides the best throughput to the user. Such a verification may be performed by sending a request and receiving a confirmation. It is to be noted that even if the instruction to connect of action 3:4 is described to take part after the information obtaining of actions 3:1 to 3:3, the instruction to connect the concept is not limited to take part in this order. The reception of action 3:4 and the obtaining of actions 3:1 to 3:3 may be performed independently of each other. For instance, the reception may be received before the obtaining or during the obtaining.

In an alternative exemplifying embodiment, which is based on the one above described embodiment, the actions 3:1, 3:2, 3:3, are omitted, and the embodiment differs from the embodiment describe above in that the creation of the ARC in action 3:5 is performed by only defining that the UE 200 was instructed to connect to the WLAN by the RAN. In this exemplifying embodiment, the connecting of the UE to the Wi-Fi network is RAN controlled.

It is to be noted that connecting of the UE to Wi-Fi, could be alternatively controlled within the disclosed concept, i.e. controlled according to ANDSF policies and rules, or controlled according to a combination of ANDSF policies and RAN.

In yet another exemplifying embodiment, which is based on one above described embodiment, the reception of the instruction to connect of action 3:4 is omitted, and the connecting of the UE to Wi-Fi is controlled according to ANDSF policies and rules.

Dependent on where the UE 200 is currently located, it may request the information from different ANDSF servers 214. For instance, when being located in a HPLMN (Home Public Land Mobile Network) the UE 200 requests an H-ANDSF (Home ANDSF) server, and when being located in a VPLMN (Visited Public Land Mobile Network) the UE 200 may request a V-ANDSF (Visited ANDSF) server. The communication policies and rules will typically vary between HPLMN and VPLMN, e.g. due to roaming costs. The operator will thereby get increased capability to control and guide the UE 200 to the Wi-Fi access point 206, e.g. due to a subscription type of the UE 200.

Figure 4:
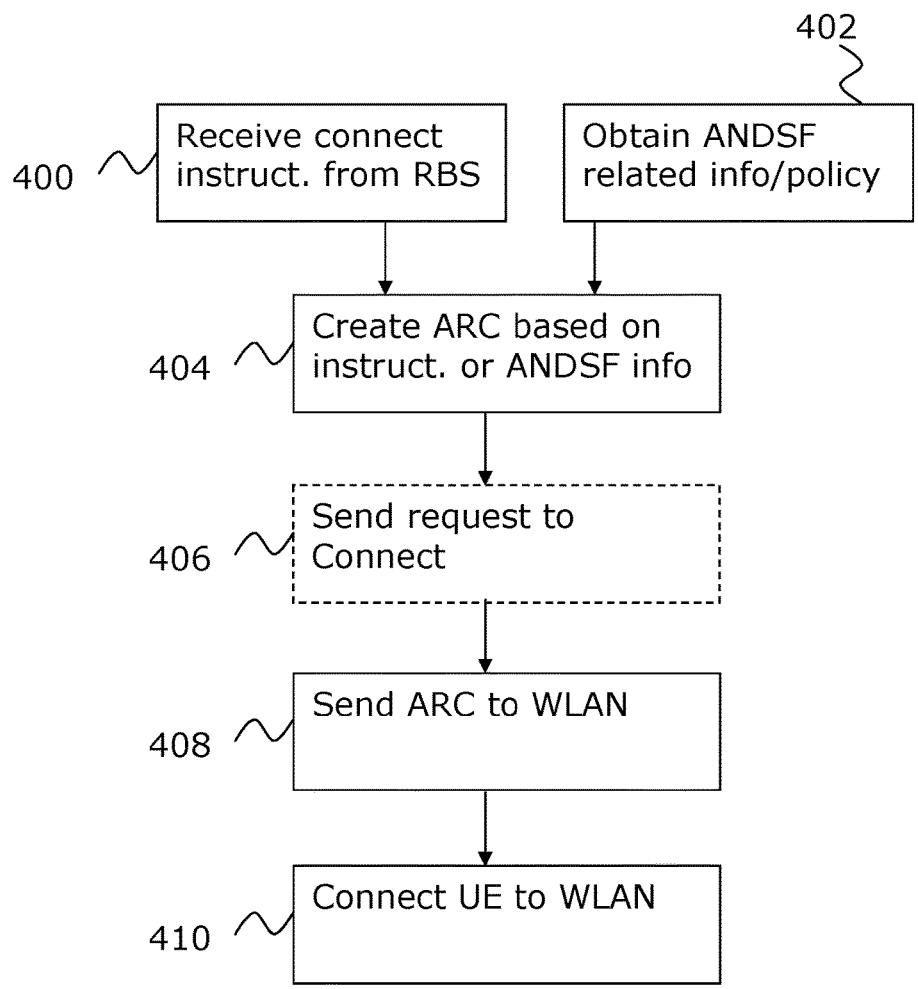
FIG. 4 is a schematic flow chart of communication scenarios, according to possible embodiments.

With reference to FIG. 4, which is a schematic flow chart, a communication scenario of a UE will now be described in accordance with one exemplifying embodiment.

Correspondingly, to an embodiment described above, the UE 200 is connected to an RBS 208, which serves a RAN 204, and the same reference numbers are used also in this embodiment when appropriate.

The UE 200 is in this exemplifying embodiment in an RRC (Radio Resource Control) connected state, either in GSM, HSPA/WCDMA or LTE. The different states may vary in the different radio access networks.

In a first action 400, the UE 200 receives an instruction to connect to a WLAN node 206 of a WLAN 202, e.g. to a Wi-Fi access point of a Wi-Fi network. The instruction is received from the RBS 208 of the RAN 204, as an explicit WLAN access selection command (this may also be called a handover command or traffic steering command), but may be alternatively implemented within the disclosed concept, which will be described below in connection with an alternative embodiment.

In a following action 404, the UE 200 creates an ARC (Association Reason Code), which defines the reason to connect to the WLAN node 206 for the UE 200. The ARC is here implemented as Probe Request message and is sent to the WLAN node 206 in a subsequent action 408. However, the disclosed concept is not limited to implement the ARC as a Probe Request message, other suitable messages may be used instead when appropriate, e.g. GAS (Generic Advertisement Service) initial request messages, 802.11 authentication request messages, and 802.11 association request messages. The GAS messages may include advertisement protocol messages such as ANQP (Access Network Query Protocol) messages. Moreover, the ARC may be implemented as a suitable parameter in an upstream authentication signal (such as EAP-SIM/AKA/AKA' related messages) or as a specific signal sent from the UE 200 to the WLAN node 206.

In a final action 410, the UE 200 connects to the WLAN node 206 in accordance with the ARC. The WLAN node 206 will then serve the UE 200 for one or more services which are performed by the UE 200. For instance, the UE 200 will communicate voice and other real-time services over RAN 204 and watch streamed media via WLAN 202.

In an alternative exemplifying embodiment, which is related to one above described embodiment, the UE 200 is in RRC idle state instead of RRC connected state. This embodiment differs in that the instruction to connect of action 400 is implemented as a RAN radio signal threshold parameter, or a WLAN radio threshold parameter. Furthermore, in the action 404 the ARC is created upon evaluation of the RAN radio signal threshold parameter, or WLAN radio signal threshold parameter. In this case the instruction may be received by the UE in the RRC idle state, or it may have been previously received while the UE was in the RRC connected state and saved for later usage in the RRC idle state.

In yet another alternative exemplifying embodiment, which is based on some above described embodiments, the action 400 is omitted, but in another initialising action 402 the UE 200 obtains information from an ANDSF server. This information relates to communication rules and policies for the UE 200. For instance, the information may comprise: which type of ANDSF rule that triggered an access attempt of the WLAN; details or priority of the ANDSF rules, etc.

However, the disclosed concept is not limited to the above described exemplifying embodiments. In another alternative embodiment which is related with some embodiments above, the UE 200 receives both an instruction according to the action 400, and obtains information from the ANDSF server according to the action 402. Then, in the action 404, a more appropriate ARC will be created by applying as well the instruction and the obtained information, before the above described actions 408 and 410 are performed.

It is further to be noted that the above described solution, will work together and coexist with prior known solutions, e.g. the Wi-Fi preference solution where the UEs connect to Wi-Fi upon detection.

When implementing such a coexisting solution, old UEs which don't support ANDSF, and which are not capable to create ARCs, may proceed to connect to Wi-Fi networks in accordance with the Wi-Fi preference solution.

Thus, as well old UEs and new UEs will be able to operate and exist within the same communication networks, but the new UEs are capable to influence the connection to Wi-Fi nodes further by creating and sending ARCs.

Figure 5:
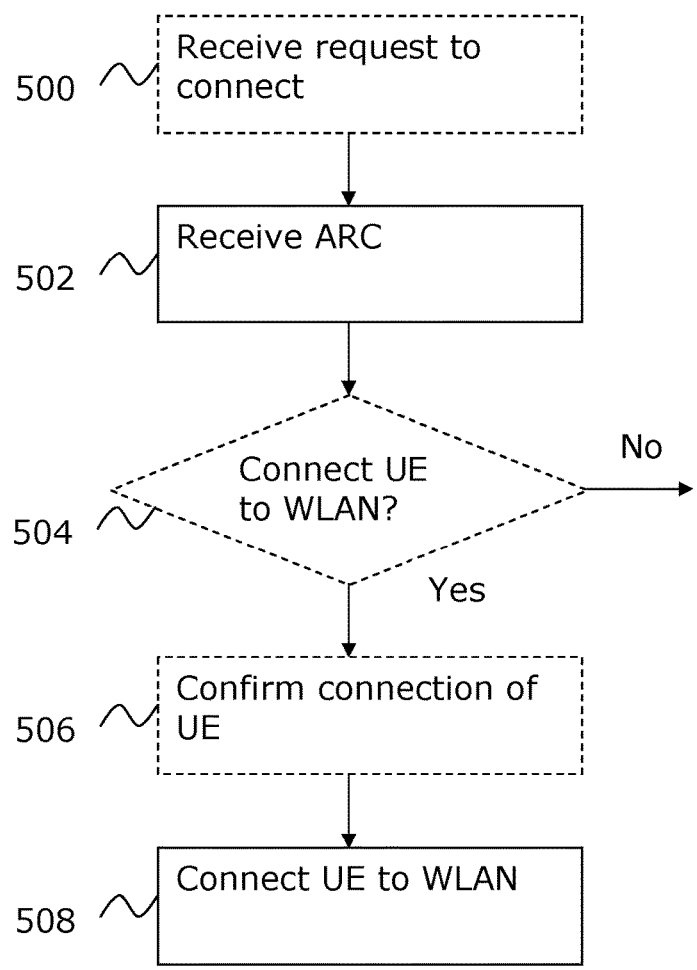
FIG. 5 is a schematic flow chart of communication scenarios, according to possible embodiments.

Similarly, to in some embodiments described above, in the embodiments described with reference to FIG. 4, the WLAN may be implemented as a Wi-Fi network, and the RAN node as an RBS in any suitable radio technology, as HSPA, LTE, LTE-Advanced, WiMax, etc. With reference to FIG. 5, which is a schematic flow chart, a communication scenario of a WLAN node will now be described in accordance with one exemplifying embodiment.

Correspondingly, to an embodiment described above, the WLAN node is implemented as a Wi-Fi access point 206 and a UE 200 will access the Wi-Fi access node 206. The same reference numbers has been used when appropriate.

In an action 502, the Wi-Fi Access point 206 receives an ARC (Association Reason Code) from the UE 200. The ARC defines a reason why the UE 200 is attempting to connect, e.g. the UE 200 is instructed by an RBS 208 to connect, or a communication policy states that the UE 200 will connect, or a combination of both RAN instruction and communication policy. The ARC may be received together with a request to connect. As stated above in connection with another exemplifying embodiment, the ARC may be received as a parameter of any appropriate messages for Wi-Fi access attempt control, Wi-Fi admission control, or Wi-Fi authentication control.

In a following action 508, the Wi-Fi access point 206 connects the UE 200 in accordance with the received ARC.

In an alternative exemplifying embodiment, which is based on the above described one, the Wi-Fi access point 206 may select whether or not to connect the UE 200, in an intermediate optional action 504 (dashed line). Such a selection may be made by comparing suitable threshold parameters at the Wi-Fi access point 206, e.g. available communication capacity, a number of currently connected UEs 200, etc. In case that the threshold parameters enables further UEs 200 to connect, the Wi-Fi access point 206 ("Yes") proceeds to action 508 and connects the UE 200, else the Wi-Fi access point 206 refuses the UE from connecting ("No").

As stated above in another exemplifying embodiment, the Wi-Fi node 206 may confirm whether or not to connect the UE 200 with a RAN node, such as a radio base station or radio network controller, etc, in another optional action 506 (dashed line).

In an alternative exemplifying embodiment, which is based on some above described embodiments, the ARC was received in action 502, upon reception of a request to connect of a prior action 500 (dashed line).

Figure 6:
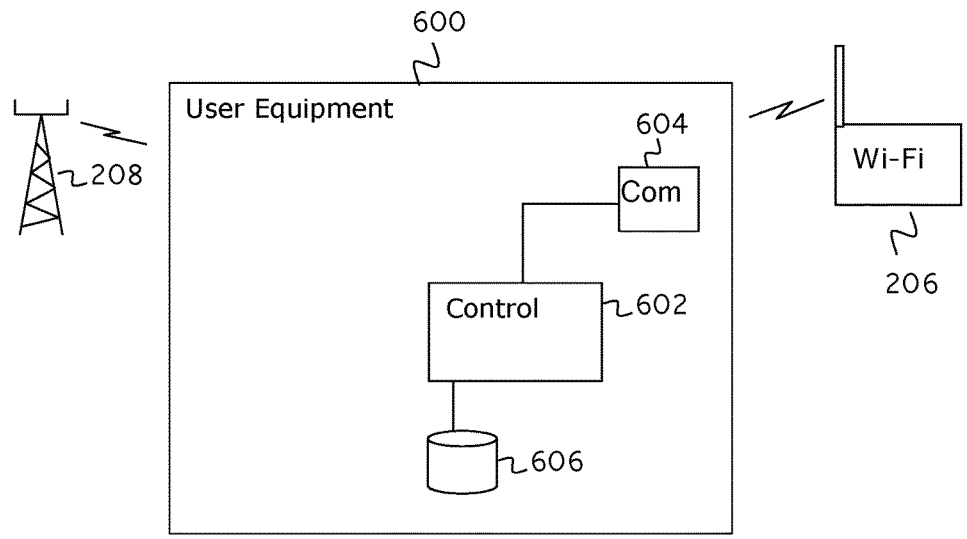
FIG. 6 is a schematic illustration of an arrangement, according to possible embodiments.

With reference to FIG. 6, which is a schematic block diagram, a UE 600 will now be described in accordance with one exemplifying embodiment.

The UE 600 is adapted to exchange data and communicate in as well a RAN and a WLAN, e.g. a Wi-Fi network.

The UE comprises a controller 602, and a communication unit 604.

The controller 602 is adapted to detect a need for the UE 600 to access the Wi-Fi network, e.g. an instruction to connect to a Wi-Fi access point 206 of the Wi-Fi network. The controller 602 is further adapted to create an ARC (Association Reason Code) based on the detected need. The communication unit 604 is adapted to provide the ARC to the Wi-Fi access point 206, such that the Wi-Fi access point 206 will be enabled to connect the UE 600 in accordance with the ARC.

The communication unit 604 is adapted to receive an instruction from an RBS of the RAN to connect the UE 600 to the Wi-Fi access point 206. Furthermore, the communication unit 604 may obtain information from an ANDSF server regarding stored communication rules and policies for the UE. Based on the instruction to connect or the obtained information, i.e. the detected needs, the controller 602 creates the ARC.

It is to be noted that the communication unit may obtain the information from the ANDSF server in a number of different ways, e.g. by so called polling (requesting and receiving) or by reception upon an appropriate update (so called pushing). Furthermore, as stated above in another exemplifying embodiment, the ARC may be sent as a parameter in a Wi-Fi access attempt control, Wi-Fi admission control, or Wi-Fi authentication.

Optionally, the UE 600 may in addition comprise a memory 606, which is adapted to store the obtained information upon reception. Thereby, the UE 600 is enabled to apply the current version of information from the memory 606 and the current ARC, and does not have to access the ANDSF server for each attempt to connect to the Wi-Fi access point 206.

Figure 7:
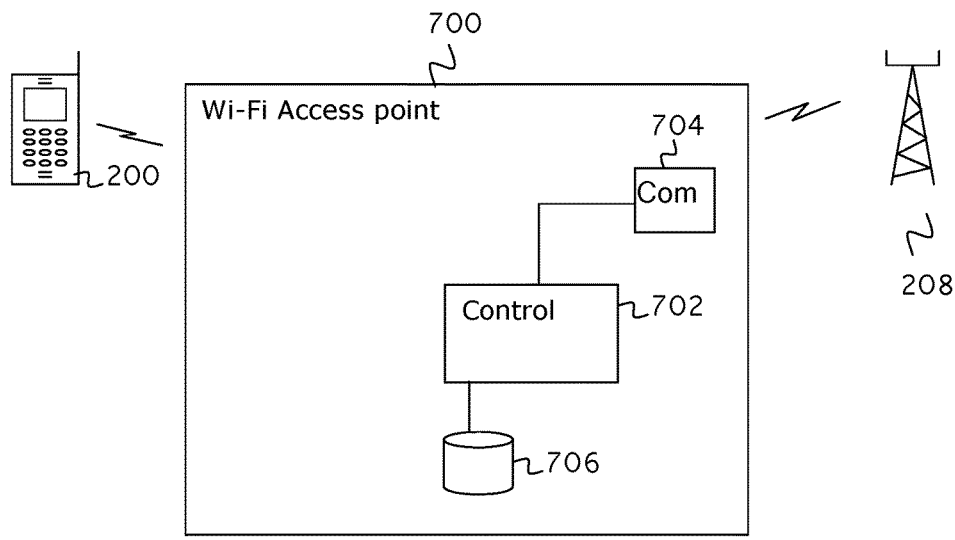
FIG. 7 is a schematic illustration of an arrangement, according to possible embodiments.

With reference to FIG. 7, which is a schematic block diagram, a WLAN node will now be described in accordance with one exemplifying embodiment.

The WLAN node is implemented as a Wi-Fi access point 700 adapted to connect a UE 200 to a Wi-Fi network of the Wi-Fi access point 700.

The Wi-Fi access point comprises a controller 702, and a communication unit 704.

The communication unit 704 is adapted to receive an ARC (Association Reason Code) from the UE 200, wherein the ARC was created by the UE 200 based on a detected need for the UE 200 to access the Wi-Fi network, e.g. an instruction to connect to the Wi-Fi access point 700. The controller 702 is adapted to connect the UE 206 in accordance with the ARC. The communication unit 704 may further be adapted to communicate with appropriate RAN nodes, such as radio base stations and radio network controllers in order to confirm UEs 200 before connecting them. Such a confirmation may enable the Wi-Fi access node to authenticate the UEs to be connected.

In alternative exemplifying embodiment, which is based on the one described above, the controller 702 is further adapted to select whether or not to connect the UE 206. Such a decision may be performed by considering available communication capacity of the Wi-Fi access point 700, such as the current number of connected UEs 200, etc. The Wi-Fi access point 700 may further comprise a memory 706 adapted to store received ARC and further communication parameters.

It is to be noted that the communication network nodes of the described exemplifying embodiments, e.g. the UE 200, 600, and the Wi-Fi access point 206, 700 are described in a non-limiting manner. However, a designer may select to implement further communication network nodes between the described communication network nodes within the described concept. Moreover, the figures and embodiments illustrate a plurality of functional units in a non-limiting manner. However, a physical implementation of the proposed communication network nodes may be performed alternatively within the disclosed concept. For instance, functionality of a specific illustrated unit may be implemented in another suitable unit when put into practice.

The proposed solution enables the co-existence of the Wi-Fi Access Attempt Control based method with the ANDSF-based method. It also enables the co-existence between the ANDSF-based methods with any solutions based on WLAN performing admission control for the UE association to WLAN, i.e. when there is no possibility for signaling in the network between the WLAN and the 3GPP RAN as in the Wi-Fi Access Attempt Control based method.

Moreover, the proposed solution also enables the co-existence between the 3GPP RAN based methods with any solutions based on WLAN performing admission control for the UE association to WLAN, i.e. when there is no possibility for signaling in the network between the WLAN and the 3GPP RAN.

The basic principle is that the UE provides an ARC (Association Reason Code) to the WLAN as part of the 802.11 procedures used to access the WLAN. The ARC indicates then for example if the reason for association was triggered by ANDSF-logic in the UE or 3GPP RAN-based logic.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a User Equipment, (UE) of enabling the UE to access a Wireless Local Area Network (WLAN), the method comprising:
   detecting a need for the UE to access the WLAN,
   creating an Association Reason Code (ARC) based on the detected need, and sending the ARC to a WLAN node of the WLAN, the ARC identifying the detected need to the WLAN node as at least one of:

an instruction from a Radio Access Network (RAN) node to connect the UE to the WLAN, and a communication policy of the WLAN that identifies that the UE should connect to the WLAN, such that the UE is thereby enabled to connect to the WLAN in accordance with the ARC.

2. The method according to claim 1, wherein detecting the need comprises at least one of:

obtaining from the RAN node the instruction to connect the UE to the WLAN, and obtaining from a network node the communication policy, wherein creating the ARC is based on at least one of the instruction to connect the UE to the WLAN and the communication policy.

3. The method according to claim 2, wherein the instruction to connect the UE comprises at least one of an explicit WLAN access selection command or RAN control parameters.

4. The method according to claim 2, wherein the various communication policies comprise information about WLAN network selection or traffic routing policies.

5. The method according to claim 1, wherein the ARC is implemented as a parameter comprised in at least one of:

a Probe Request message, a Generic Advertisement Service (GAS) initial request message, a 802.11 authentication request message, an association request message.

6. The method according to claim 2, wherein the ARC is implemented as a:

parameter in an upstream authentication signal, or a signal from the UE to the WLAN node, the parameter or signal being provided to the WLAN node before an authentication decision is taken by the WLAN node.

7. The method according to claim 3, wherein the UE is in RRC connected state, and the ARC is created upon reception of the explicit WLAN access selection command from the RAN node.

8. The method according to claim 3, wherein the UE is in RRC idle state, and the ARC is created upon evaluation of the RAN control parameters received from the RAN node.

9. The method according to claim 4, wherein the ARC is created upon evaluation of the WLAN network selection or traffic routing policies, and the instruction to connect the UE.

10. The method according to claim 1, wherein the WLAN is implemented as a Wireless Fidelity (Wi-Fi) network, and the WLAN node is implemented as a Wi-Fi Access Point (AP) or a Wi-Fi Access Controller (AC).

11. A User Equipment (UE) adapted to access a Wireless Local Area Network (WLAN), the UE comprising a controller adapted to:

detect a need for the UE to access the WLAN, and create an Association Reason Code (ARC) based on the detected need, and wherein the UE further comprises a communication unit adapted to send the ARC to a WLAN node of the WLAN, such that the UE is thereby enabled to connect to the WLAN in accordance with the ARC, the ARC identifying the detected need to the WLAN node as at least one of:

an instruction from a Radio Access Network (RAN) node to connect the UE to the WLAN, and a communication policy of the WLAN that identifies that the UE should connect to the WLAN.

12. The UE according to claim 11, wherein the communication unit is further adapted to perform at least one of:

obtaining from the RAN node the instruction to connect the UE to the WLAN, and obtaining from a network node the communication policy, and wherein the controller is adapted to detect the need to access the WLAN, based on at least one of the instruction to connect the UE and the communication policy.

13. The UE according to claim 12, wherein the communication unit is adapted to obtain the instruction to connect the UE as at least one of an explicit WLAN access selection command or RAN control parameters.

14. The UE according to claim 12, wherein the communication unit is adapted to obtain the various communication policies as information about WLAN network selection or traffic routing policies.

15. The UE according to claim 13, wherein the controller is further adapted to create the ARC upon reception of the explicit WLAN access selection command, when the UE is in RRC connected state.

16. The UE according to claim 13, wherein the controller is further adapted to create the ARC upon evaluation of the RAN control parameters, when the UE is in RRC idle state.

17. The UE according to claim 14, wherein the controller is further adapted to create the ARC upon evaluation of the WLAN network selection or traffic routing policies, and the instruction to connect the UE.

18. The UE according to claim 11, wherein the WLAN is a Wireless Fidelity (Wi-Fi) network, and the communication unit is adapted to exchange information with the WLAN node in accordance with a Wi-Fi standard.

19. A method performed by a Wireless Local Area Network (WLAN) node of enabling a User Equipment (UE) to access a WLAN, the method comprising:

receiving an Association Reason Code (ARC) from the UE, the ARC being created based on a detected need to access the WLAN, the ARC identifying the detected need to the WLAN node as at least one of:

an instruction from a Radio Access Network (RAN) node to connect the UE to the WLAN, and a communication policy of the WLAN that identifies that the UE should connect to the WLAN, such that the WLAN node is thereby enabled to connect the UE to the WLAN in accordance with the ARC.

20. The method according to claim 19, wherein the WLAN node is enabled to select whether to connect the UE, or refuse to connect the UE, based on the ARC.

21. The method according to claim 19, further comprising that the WLAN node confirms the connection with the RAN node.

22. A Wireless Local Area network (WLAN) node adapted to enable a User Equipment (UE) to access a WLAN, the WLAN node comprises a controller and a communication unit, wherein:

the communication unit is adapted to receive an Association Reason Code (ARC), wherein the ARC is created based on a detected need of the UE to access the WLAN, and wherein the ARC identifies the detected need to the WLAN node as at least one of:

an instruction from a RAN node to connect the UE to the WLAN, and a communication policy of the WLAN that identifies that the UE should connect to the WLAN, and the controller is adapted to connect the UE in accordance with the ARC.

23. The WLAN node according to claim 22, wherein the controller is further adapted to select whether to connect the UE, or refuse to connect the UE, based on the ARC.

24. The WLAN node according to claim 22, wherein the controller is further adapted to confirm the connection with the RAN node.

\* \* \* \* \*